United States Patent
Gazzetta et al.

(10) Patent No.: US 6,804,466 B1
(45) Date of Patent: Oct. 12, 2004

(54) OPTICAL CODING SYSTEM

(75) Inventors: Moreno Gazzetta, Regensdorf (CH); Roger Scherrer, Duebendorf (CH); Dietrich Peter Stauffacher, Zurich (CH)

(73) Assignee: Contraves Space AG, Zurich (CH)

( * ) Notice: Subject to any disclaimer, the term of this patent is extended or adjusted under 35 U.S.C. 154(b) by 0 days.

(21) Appl. No.: 09/471,548

(22) Filed: Dec. 23, 1999

(30) Foreign Application Priority Data

Dec. 24, 1998 (CH) ................................................ 2559/98

(51) Int. Cl.$^7$ ................................................ H04B 10/00
(52) U.S. Cl. .................. 398/140; 398/189; 398/190; 398/200; 398/98; 398/99; 398/202; 375/316; 375/340; 375/342; 434/11; 434/16; 434/21; 434/22
(58) Field of Search .................. 398/140, 189, 398/190, 202, 98, 200, 99; 375/316, 340, 342; 434/22, 11, 16, 21

(56) References Cited

U.S. PATENT DOCUMENTS

| | | | |
|---|---|---|---|
| 4,373,916 A | 2/1983 | Ashford et al. | |
| 4,561,117 A | * 12/1985 | Kuhn | ........................ 455/608 |
| 5,317,582 A | 5/1994 | Siebert | |
| 5,788,500 A | 8/1998 | Gerber | |
| 5,808,770 A | * 9/1998 | Chen et al. | .................. 359/182 |
| 6,381,053 B1 | * 4/2002 | Fathallah et al. | ........... 359/136 |

OTHER PUBLICATIONS

Gruber et al., "Electronic Circuits for High Bit Rate Digital Fiber Optic Communication Systems," *IEEE Transactions on Communications*, vol. Com–26, No. 7, pp. 1088–1097 (Jul. 1978).

* cited by examiner

*Primary Examiner*—Leslie Pascal
*Assistant Examiner*—Hanh Phan
(74) *Attorney, Agent, or Firm*—Townsend and Townsend and Crew LLP; Guy W. Chambers

(57) ABSTRACT

An optical coding system is provided for a data transmission device with at least one laser transmitter and at least one laser receiver. The laser transmitter has a laser device and a code generator, and the laser receiver a detector device and an evaluation circuit. The detector device is designed for detecting a burst sequence (B1, B2, B3, . . . ), wherein the length d of the pulses of a burst is greater than 400 ns, and the length D of a burst consisting of a number b of pulses is less than 1000 μs.

10 Claims, 3 Drawing Sheets

OPTICAL CODING SYSTEM

TECHNICAL FIELD OF THE INVENTION

The invention relates to an optical coding system.

BACKGROUND OF THE INVENTION

Modern infrared transmission systems, in particular for simulation purposes, often comprise a laser transmitter and at least one laser receiver, equipped with special detectors. Such laser transmitters can be equipped, for example with GaAs-injection semiconductor laser diodes for pulsed operation, and operate at a wavelength=904.5 nm, which results from the active material, a power output Pp=1 W and a current I=10 A, so that the laser driver requires a relatively high supply voltage of up to 100 V.

As recited in U.S. Pat. No. 5,788,500, it is also possible to employ a CW-capable laser diode of a wavelength–830 nm and with a power output Pw of, for example, only 55 mW, wherein the laser beams can then be switched on and off in a burst oscillation form (burst mode).

Both types of infrared data transmissions have advantages and disadvantages. However, the outlay is larger with the first type.

OBJECT AND SUMMARY OF THE INVENTION

It is now the object of the invention to create a less elaborate optical coding system with a relatively large range.

An optical coding system is provided for a data transmission device with at least one laser transmitter and at least one laser receiver. The laser transmitter has a laser device and a code generator, and the laser receiver a detector device and an evaluation circuit. The detector device is designed for detecting a burst sequence (B1, B2, B3, . . . ), wherein the length d of the pulses of a burst is greater than 400 ns, and the length D of a burst consisting of a number b of pulses is less than 1000 $\mu$s.

Other advantageous embodiments of the invention ensue from the further dependent claims.

BRIEF DESCRIPTION OF THE DRAWINGS

In what follows, the invention will be explained in greater detail by way of example, making reference to the drawings. Shown are in.

DETAILED DESCRIPTION OF THE PREFERRED EMBODIMENTS

Figure 1:
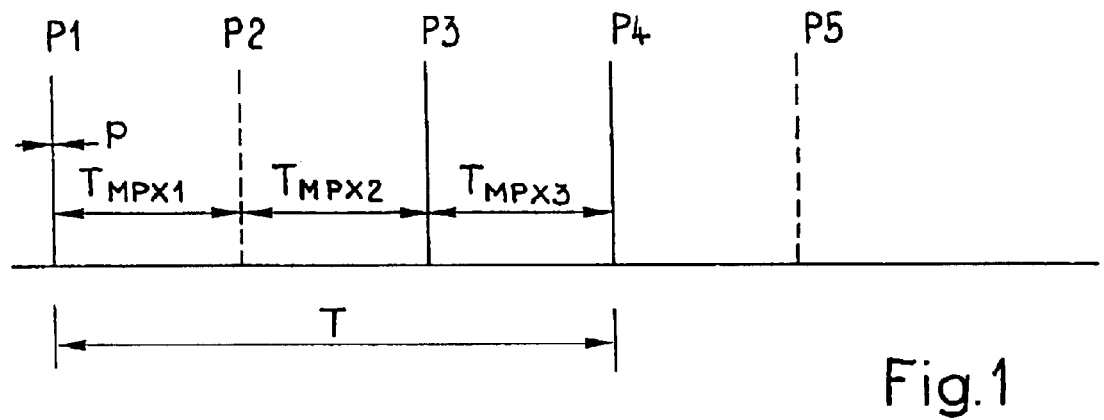
FIG. 1, a schematic representation of a possible coding of an infrared transmitting device with a high power output, FIG. 2, a schematic representation of a special coding in accordance with the invention for increasing the range of an infrared data transmitting device with a CW-capable laser diode, FIG. 3, a schematic block circuit diagram of an optical coding system in accordance with the invention for an infrared data transmitting device with a CW-capable laser diode operating with this special coding, and FIG. 4, a schematic block circuit diagram of a special decoding device of a coding system in accordance with the invention.

As represented in FIG. 1, a possible coding consists, for example, of strong pulses P1, P2, P3, P4, P5, . . . with a pulse width p<200 ns. In this example, the pulses P1 and P4 constitute a main series, corresponding to a main information channel, wherein a time period T is provided for repeating these pulses, or respectively pulse gaps. The pulses P2, P3, P5, . . . however, relate to arbitrary other information channels, which are chronologically interspersed in a multiplex operation, if multiplexed sequences are transmitted at time intervals TMPX1, TMPX2, TMPX3, . . . In FIG. 1, P2 and P5 represent examples of pulse gaps. In an actual case, the pulses can have a width p of 100 ns to 200 ns, and the period can be T=333.333 $\mu$s.

Figure 2:
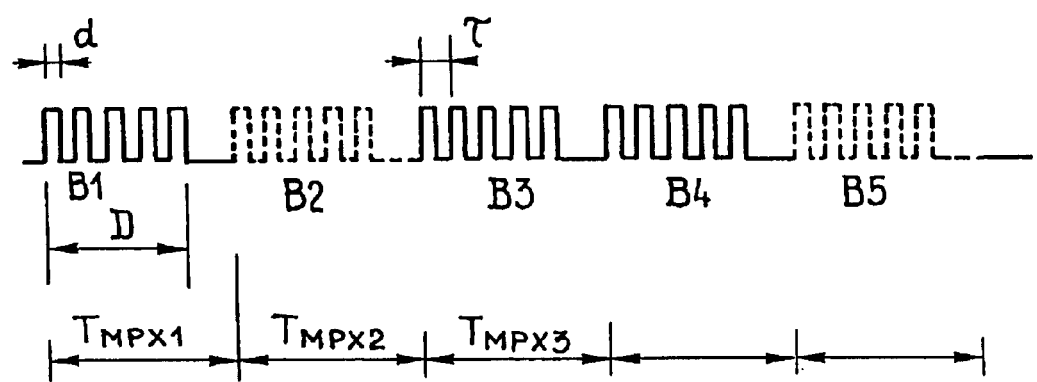

FIG. 2 shows how these pulses P1, P2, P3, P4, P5, . . . , can be replaced in accordance with the invention by relatively weak, but considerable wider pulse groups (bursts) B1, B2, B3, B4, B5, . . . , in that a burst (FIG. 2) is assigned to each pulse (FIG. 1) and a burst gap is provided for each pulse gap, so that this burst series (FIG. 2) can contain the same information as the pulse series (FIG. 1). A burst consists of a number b of pulses; b can be between 3 and 12, for example.

The coding can also be performed with variable time intervals for the multiplexed sequences in such a way, that the time interval T (FIG. 1) is variable, in order to obtain whole numbers in a predetermined time unit expressed, for example, in milliseconds. In this way it is possible, for example, for the period T to sequentially have the values T1=333 $\mu$s, T2=334 $\mu$s, and T3=333 $\mu$s, so that T1+T2+T3= 1000 $\mu$s which, with a conventional distribution would respectively lead to Tk=333+⅓ $\mu$s. T4=333 $\mu$s, T5=334 $\mu$s, and T6=333 $\mu$s, etc. also applies to the next periods. For the length D in $\mu$s of a burst of b pulses (FIG. 2), the equation D=[(b−1)·+d] applies. In this case, for example, the length d of a pulse of such a burst can be greater than 1 $\mu$s, and the length D of the burst less than 22 $\mu$s. However, in a preferred embodiment of the system of the invention, the length d=2 $\mu$s, and the gap between two pulses also 2 $\mu$s.

Figure 3:
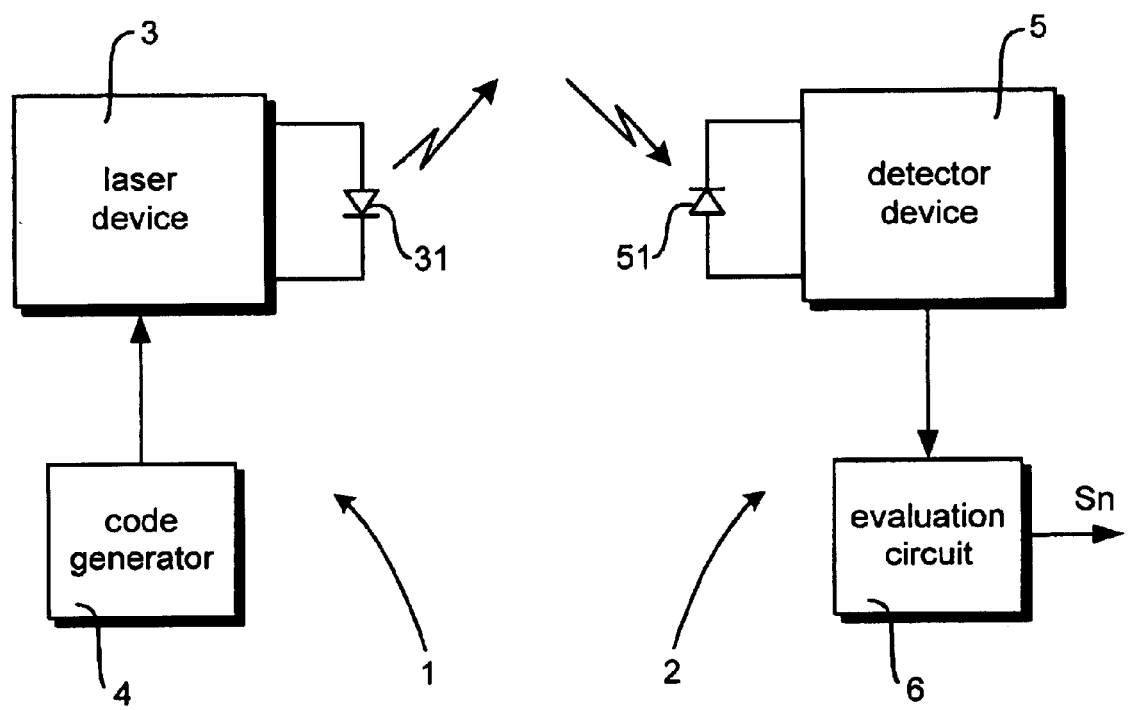

The data transmission device in accordance with FIG. 3 comprises a laser transmitter 1 and a laser receiver 2, which preferably operate by means of infrared radiation. The transmitter 1 has a laser device 3 and a code generator 4, which are designed in such a way that the laser transmitter transmits a burst sequence B1, B2, B3, . . . , which corresponds to a predetermined pulse sequence. The receiver is optimized for this burst mode. The length d is at least two or three times greater than the width p of the pulses P1, P2, . . . , the length D of a burst consisting of b pulses however is less than the length T, or respectively less than TMPXmin, if k multiplexed sequences are transmitted at different time intervals TMPX1, TMPX2, TMPX3, . . . (FIG. 1), wherein k can easily be 2 or 3 or 4, etc., up to 40 and more.

The laser receiver 2 has a detector installation 5 and an evaluation circuit 6, which delivers the desired information signals Sn in the preselected sequence.

The laser device 3 comprises a laser diode 31, which has a much smaller power output than the ones usually used otherwise in pulsed lasers. However, this is compensated by the considerably greater length D, which corresponds to an increase in the total radiated energy. Tests have shown that the receiver detectors 51 cumulate the received energy and that therefore the range achieved by an infrared data transmission device with a CW-capable laser diode in accordance with FIG. 3 is relatively large.

But the device in accordance with FIG. 3 entails the additional advantages that a CW-capable laser diode is more advantageous than a GaAs-injection laser diode, that a laser driver contained in the laser device 3 is more advantageous, since no components of the electronic power devices and no relatively high supply voltages need to be used, and that the dependability (MTBF: Mean Time Between Failures) of the laser driver is greater, since only low voltages and currents are required for the laser diode. Moreover, the laser diode in accordance with the invention operates preferably on a wavelength of 830 nm, which is better visible with night vision devices (night vision goggles) than if using the other common wave length of 904.5 nm, and the laser diode can be triggered in the CW mode; these two properties are especially important in the employment of target lasers.

Figure 4:
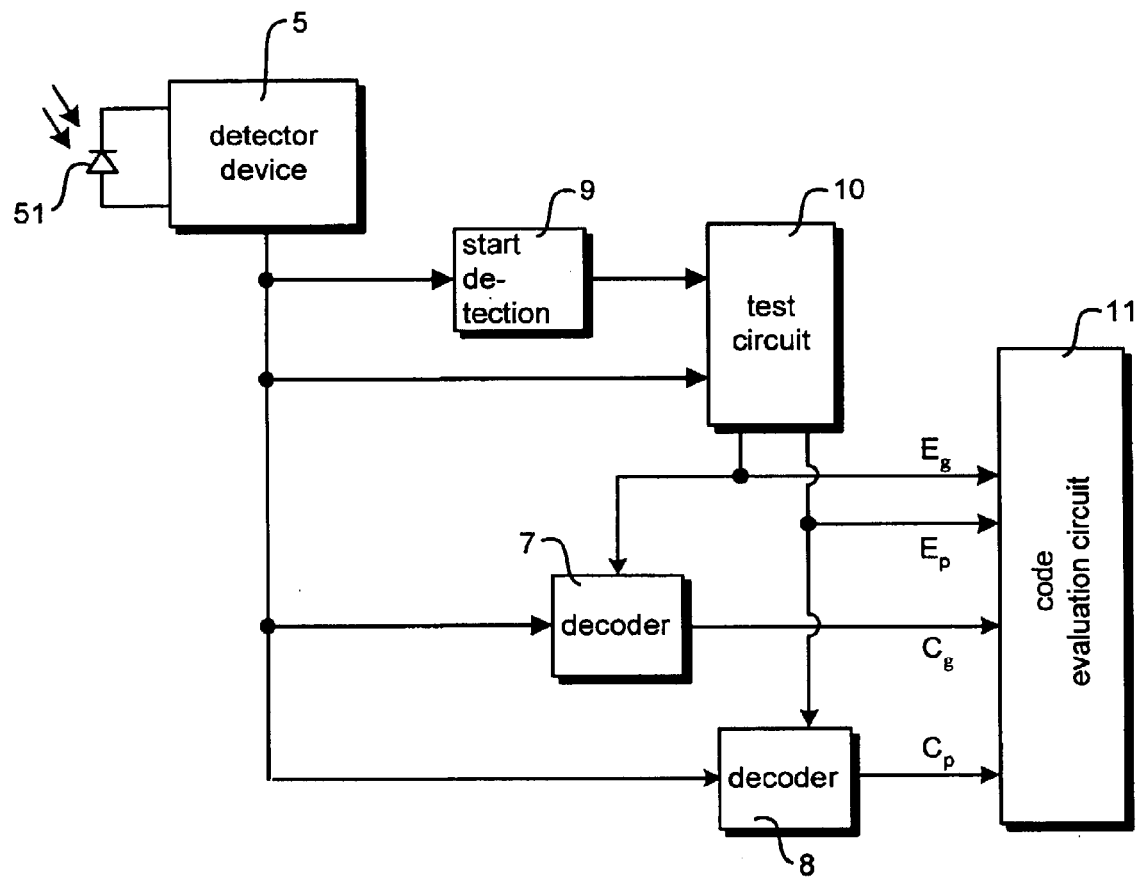

In the special decoding device for the optical coding system in accordance with the invention represented in FIG. 4, two decoders 7 and 8, a start detection device 9 and a test circuit 10 are connected to the output of the detector device 5, wherein a further input of the test circuit 10 is connected with the output of the device 9, which not only provides a release pulse (enable) Eb for the decoder 7 and for a code evaluation circuit 11, but also a release pulse (enable) Ep for the decoder 8 and the code evaluation circuit 11, which are additionally connected on the input side with the outputs of the decoders 7 and 8.

The decoding device in accordance with FIG. 4 functions as follows:

The detector 51 or the detectors of the receiver 2 can detect the radiation with the pulses P1, P2, . . . , (FIG. 1), or the bursts B1, B2, . . . , (FIG. 2). However, pulses always appear at the output of the detector device 5. The system preferably operates with a coding which meets a particular specification which, for example, consists in that at the start of each information package always two pulses of a main series are transmitted at a predetermined time interval T. The decoder 8 is provided for decoding the pulses which meet this particular specification, regardless of whether they were obtained from the pulses P1, P2, . . . or the bursts B1, B2, . . . As soon as the start detection device 9 detects the start of an information package, it activates the test circuit 10. As soon as the latter detects that the mentioned specification has been met, and as long as the information package lasts, the test circuit 10 emits a signal Ep to the decoder 8 and to the code evaluation circuit, and the system operates in a manner in accordance with this particular specification. If no pulses arrive which meet the said specification, the test circuit 10 provides a signal Eb in order to switch the system to another operation, namely preferably for enabling the detector device 5 to work together with a laser transmitter of the burst type. However, the sequence can also be reversed.

The system can also be realized by means of software, and the intervals T can be chronologically changed in accordance with a special preprogrammed specification. However, the value T is preferably constant or variable, namely in the above mentioned sequence T1, T2, T3, . . . Tn, Tn+1, Tn+2, . . . , for example corresponding to a frequency of ½ kHz, ⅓ kHz or ¼ kHz, etc., or a multiple thereof, in that the sums of T1+T2+. . .+Tn=Tn+1, Tn+2, . . . , T2n, etc. are constant, and wherein other arbitrary values can also be useful. The decoder 8 can be designed for decoding pulses even if the period T=Tp of the pulses (FIG. 1) is constant, and the period T=Tb (FIG. 2) is variable; in this case the sum of n bursts can equal n·Tp.

The laser receiver 2 can have at least one detector 51, which is sensitive at least to the wavelengths between 800 nm and 1100 nm wherein, if desired, the laser receiver can have a limiting device (limiter) for the protection of the further electronic devices. However, the laser receiver 2 can also have at least one detector for wavelengths in a range of at least approximately 830 nm, and at least one further detector for wavelengths in a range of at least approximately 904.5 nm.

Thus, the laser receiver 2 comprises detection means 9, 10 for pulse sequences (FIG. 1) or burst sequences (FIG. 2), which meet a predetermined particular specification, wherein the decoder 8 is then active. Otherwise, the decoder 7 is active. This specification preferably consists in that two constantly repeated pulses, or respectively bursts, at an interval T, or respectively T1, T2, T3, . . . , are to be detected. These decoder means, and possibly also the detection means, are preferably realized at least in part by means of software.

For example, the coding system in accordance with the invention can be realized in devices, which can be used for the purposes of sports, as toys, for firing exercises of the police or military training purposes. In this case the transmitter can also have LEDs (light emitting diodes) as the transmitting elements.

The above represented exemplary embodiments should be understood to be only an illustration of the use of such a coding system. Other embodiments, which immediately result therefrom for one skilled in the art, however, also contain the basic concept of the invention, in particular the corresponding coding system, or respectively the decoding system, are also to be separately protected in itself.

What is claimed is:

1. A coding system with a data transmission device with at least one laser transmitter and a code generator for communicating with a laser receiver having a detector device for receiving a strong pulse sequence of narrow pulse width from 100 to 200 ns and an evaluation circuit for decoding the code generator comprising:

the data transmission device is a CW-capable laser diode of a wavelength wherein a laser beam can be switched on and off in a burst sequence which contains at least a main series of bursts of a repetition rate T having a length d of the pulses of about 400 ns and the bursts consists of a number b of pulses having a combined pulse length D which is less than a threshold value Tg=1000 μs, said burst sequence emulating a strong pulse sequence of narrow pulse width from 100 to 200 ns.

2. The coding system in accordance with claim 1, wherein the detector device is also designed for detecting a sequence of pulses, whose length is shorter than 400 ns and which contains at least one main series of pulses.

3. The coding system in accordance with claim 1, wherein the repetition period of the pulses and/or of the bursts is variable for obtaining whole number values T1, T2 . . . Tn for the repetition period in a predetermined time unit, and that the burst length is less than the minimum value of these time intervals T1, . . . Tn.

4. The coding system in accordance with claim 3, wherein with arbitrary values of j=0, 1, 2 . . . and a predetermined value of n, the sum of n repetition periods T1+j, T2+j, . . . Tn+j, is constant.

5. The coding system in accordance with claim 1, wherein multiplexed sequences are transmitted at different time intervals, and that the length of a burst consisting of multiple pulses is less than the shortest of these time intervals.

6. The coding system in accordance with claim 1, wherein the laser receiver has first and second decoders and contains detection means for pulse sequences or burst sequences such that when a predetermined specification has been met, the first decoder is active, otherwise the second decoder is active.

7. The coding system in accordance with claim 6, wherein the first and second decoders and/or detection means have been at least partially realized by means of software.

8. The coding system in accordance with claim 1, wherein said laser receiver has at least one detector which is sensitive at least to wavelengths between 800 nm and 1100 nm.

9. The coding system in accordance with claim 1, wherein said laser receiver has at least one detector for wavelengths in the range of at least approximately 830 nm, and at least one further detector for wavelengths in a range of at least approximately 904.5 nm.

10. The coding system in accordance with claim 6, wherein said detector device and said decoders are designed for processing pulses even if their repetition rate is variable, in order to obtain whole number values T1, T2, . . . Tn for the repetition rate during a predetermined period time unit.

* * * * *

UNITED STATES PATENT AND TRADEMARK OFFICE
CERTIFICATE OF CORRECTION

PATENT NO. : 6,804,466 B1
DATED : October 12, 2004
INVENTOR(S) : Gazzetta, Moreno et al.

It is certified that error appears in the above-identified patent and that said Letters Patent is hereby corrected as shown below:

<u>Title page,</u>
Item [73], Assignee, should read as follows: -- Oerlikon Contraves AG --

Signed and Sealed this

Twenty-second Day of March, 2005

JON W. DUDAS
*Director of the United States Patent and Trademark Office*